United States Patent [19]

Haville

[11] Patent Number: 4,736,141

[45] Date of Patent: Apr. 5, 1988

[54] APPARATUS TO CONTROL DIRECTION OF ROTATION OF A BRUSHLESS MOTOR AS A FUNCTION OF POWER POLARITY

[75] Inventor: Douglas Haville, Oceanside, Calif.

[73] Assignee: BEI Electronics, Inc., San Francisco, Calif.

[21] Appl. No.: 67,316

[22] Filed: Jun. 26, 1987

[51] Int. Cl.[4] .............................................. H02K 29/08
[52] U.S. Cl. .................................... 318/254; 318/138; 318/439
[58] Field of Search ............... 318/138, 254, 255, 256, 318/280, 439

[56] References Cited

U.S. PATENT DOCUMENTS 3,906,314  9/1975  Wairt .............................. 318/254 X
3,946,292  3/1976  Tanikoshi .......................... 318/138
4,446,406  5/1984  Uzuka ............................. 318/439 X Primary Examiner—Bentsu Ro
Attorney, Agent, or Firm—Limbach, Limbach & Sutton

[57] ABSTRACT

An apparatus for use with a multi-phase brushless DC motor which is driven by signals from a motor controller/driver device, in which power supplied to the motor controller/driver device is routed through a bridge rectifier circuit so that the proper polarity of voltage is supplied to the motor controller/driver device, and also including a circuit connected between a power lead to the motor controller/driver device and input terminal of the bridge rectifier circuit so that a forward/reverse control signal is generated and can be applied to the motor controller/driver to control the direction of rotation of the motor as a function of the polarity of the power supplied to the bridge rectifier circuit.

4 Claims, 2 Drawing Sheets

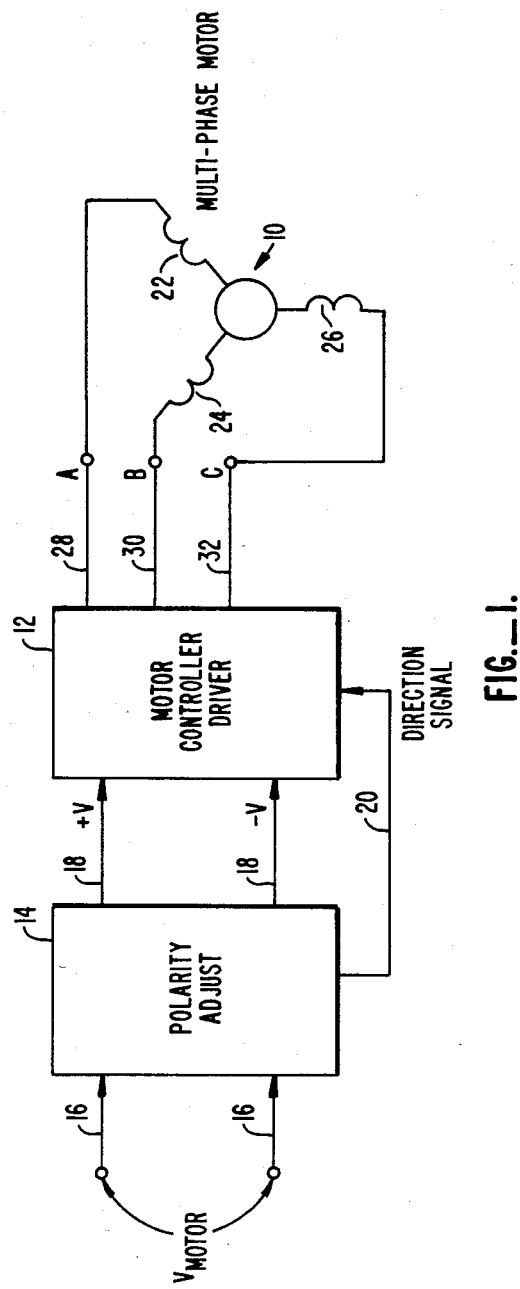
FIG._1.

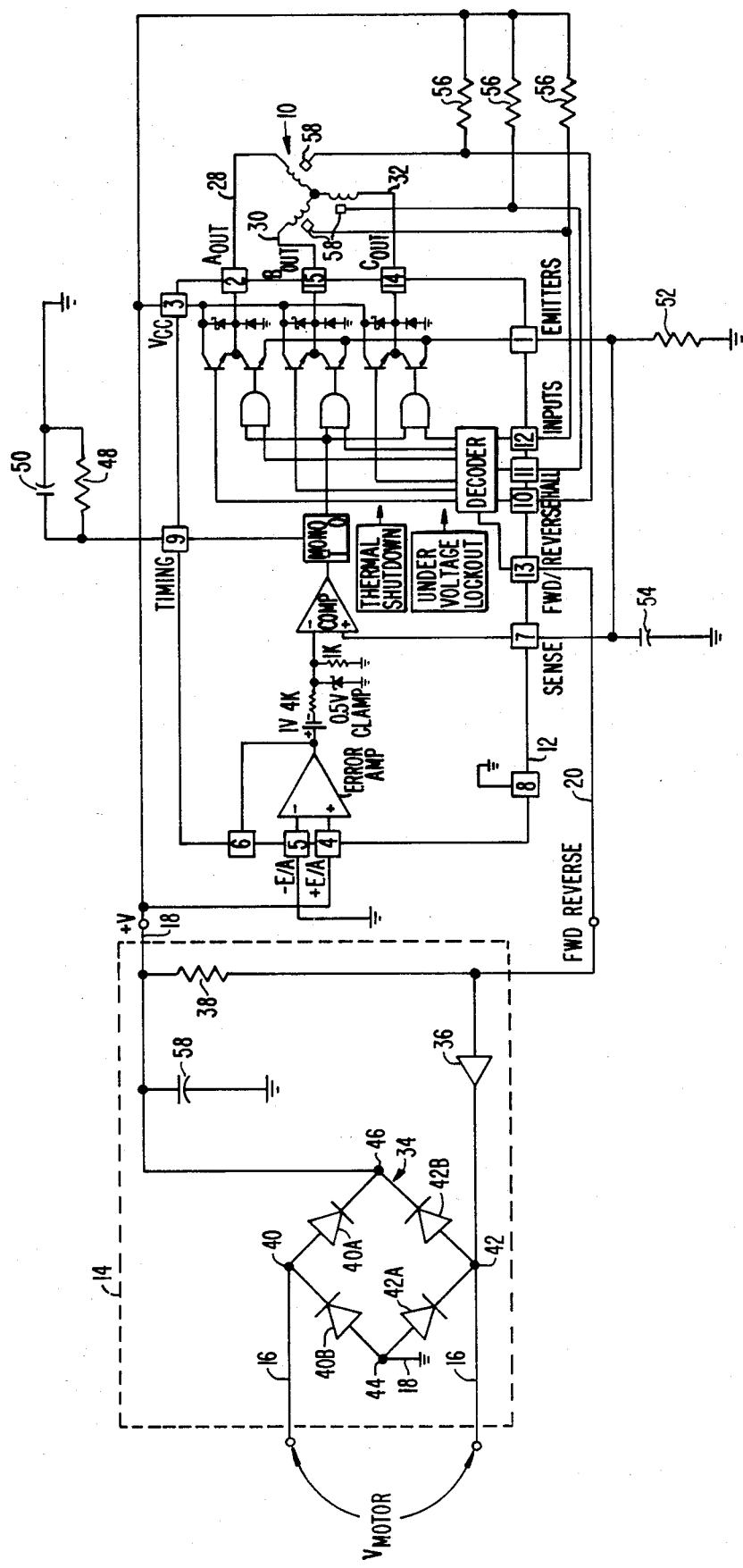
FIG._2.

4,736,141

APPARATUS TO CONTROL DIRECTION OF ROTATION OF A BRUSHLESS MOTOR AS A FUNCTION OF POWER POLARITY

TECHNICAL FIELD

The present invention is directed, generally to brushless motor control, and, more particularly, to an apparatus for controlling the direction of rotation of a brushless motor as a function of the polarity of the power applied to it.

BACKGROUND ART

Multi-phase brushless DC motors require specific drive signals to be supplied to each of the motor windings in order to obtain proper rotation of the motor. The relative position and timing of each of these drive signals, to each of the windings, is referred to as commutation and is the subject of a significant amount of work in the motor arts.

In that area, integrated circuit devices have been developed which provide circuitry for generating the drive signals and controlling the relative timing of the application of the drive signals to the motor windings. Among these integrated circuit devices are device number UC3620 manufactured by Unitrode Corporation, Lexington, Mass., and device numbers UDN-2936W and UDN2937W, manufactured by Sprague of Worcester, Mass. These integrated operate off of the power supplied to the motor and are therefore dependent upon a correct polarity of the motor power supply to operate properly. More specifically, these devices expect a positive voltage to be applied to a specific pin and a ground potential to be connected to another specific pin. Reversal of the polarity of potential supply to the pins will cause the devices to be inoperative and perhaps their destruction.

Reversal in direction of rotation of motors controlled by the above integrated circuit devices is obtained by applying a direction control signal to a direction control pin.

Thus, a disadvantage of controlling multi-phase DC brushless motors with these integrated circuit devices or devices similar thereto, is the need to pay particular attention to the polarity of voltage being applied to the devices and to the motor, and the further requirement of applying a direction control signal to a direction control pin to obtain the proper direction of rotation.

SUMMARY OF THE INVENTION

These and other disadvantages of state of the art control circuitry for multi-phase brushless DC motors are overcome by the present invention of an apparatus responsive to motor operating power and polarity thereof for use with a multi-phase DC brushless motor and motor control integrated circuit for providing the correct polarity of power supply voltage to the motor control device, and for providing a signal to the motor control device which will cause the motor to rotate in a direction which is a function of the polarity of the motor operating power supply voltage.

In the preferred embodiment of the present invention, a bridge rectifier is utilized having a first pair of terminals connected to the motor power supply and a second pair of terminals connected to supply power to the motor controller device. In turn, the motor controller device supplies the driving signals to the windings of the motor. A direction signal generation circuit is connected to one of the first pair of terminals, to one of the second pair of terminals, and to the direction control pin of the controller device. With the above circuit, the motor can be caused to rotate in a direction which is a function of the polarity of the motor power supply. In this manner, a multi-phase brushless DC motor can mimic brush type PM motors; i.e., the direction of rotation of the motor is determined by the polarity of power supplied to the motor.

It is therefore an object of the present invention to provide an apparatus for use with a multi-phase brushless DC motor which is controlled by a motor controller device which eliminates the requirement that the user pay attention to the polarity of the power being applied to the motor.

It is another object of the present invention to provide an apparatus which provides the correct polarity to a multi-phase brushless DC motor and motor controller device regardless of the polarity of power applied to it.

It is a further object of the present invention to provide an apparatus for use with a multi-phase brushless DC motor and motor controller device which permits the combination to mimic the operation of brush type PM motors.

These and other objectives, features and advantages of the present invention will be more readily understood upon consideration of the following detailed description of the preferred embodiment and accompanying drawings.

BRIEF DESCRIPTION OF THE DRAWINGS

FIG. 1 is a simplified functional drawing of a polarity control circuit shown in use with a multi-phase brushless DC motor and motor controller device.

FIG. 2 is a more detailed schematic of the present invention.

DETAILED DESCRIPTION OF THE PREFERRED EMBODIMENT

Referring to FIG. 1, the present invention involves a multi-phase motor, such as a three-phase, brushless, DC motor 10, a motor controller driver circuit 12, and a polarity adjust circuit 14. The polarity adjust circuit 14 receives the power for the motor at lines 16, indicated by $V_{motor}$. It is to be noted that there is no polarity assigned to the power signal, $V_{motor}$. This is because polarity adjust circuit 14 automatically provides the appropriate polarity of power to motor controller driver 12 on lines 18 as indicated in the figure. Polarity adjust circuit 14 also provides a direction signal on line 20. This direction signal is a function of the polarity of the $V_{motor}$ signal applied to lines 16.

In turn, motor controller driver 12 supplies the drive signals for the motor windings 22, 24 and 26 by way of lines 28, 30 and 32, respectively. The result of such an interconnection is that the motor 10 will rotate in one direction for one polarity of $V_{motor}$, and in an opposite direction for the opposite polarity of $V_{motor}$, without the possibility of damaging the motor controller driver 12 by the incorrect polarity of supply voltage applied to it.

Referring to FIG. 2, the present invention is shown in greater detail. Starting at the left of the figure, polarity adjust circuit 14 can include a bridge rectifier 34, and a diode 36 connected in series with a resistor 38.

Bridge rectifier 34 has a pair of input terminals 40 and 42, and a pair of output terminals 44 and 46. Input terminals 40 and 42 receive the $V_{motor}$ signal on lines 16, while output terminal 44 and 46 supply power to motor controller driver 12.

One end of resistor 38 is connected to one of the pair of output terminals, in this case terminal 46. The other end of resistor 38 is connected to the anode of diode 36. The cathode of diode 36 is connected to one of the input terminals, in this case terminal 42. The junction of diode 36 and resistor 38 is connected to the forward/reverse line 20 of motor controller driver 12.

Motor controller driver 12, as described above, provides phased drive signals to the windings of a multi-phase motor 10. As discussed above, motor controller driver 12 can be a commercially available controller integrated circuit such as device number UC3620 manufactured by Unitrode Corporation of Lexington, Mass., or device numbers UDN-2936W or UDN-2937W manufactured by Sprague of Worcester, Mass. In FIG. 2, a functional block diagram for the Unitrode device is shown connected in accordance with the preferred embodiment of the present invention. The supply voltage to the device, pin 3, is received from polarity adjust circuit 14 via line 18 and terminal 46. The return path for the power supply is connected to pin 8 of the device via line 18 and terminal 44. Resistor 48 and capacitor 50, shown connected between ground and timing pin 9, provide an RC time constant which affects the off time for the output drive signals. Resistor 52 and capacitor 54, shown connected between ground and pins 1 and 7, are utilized for current limiting purposes. Resistors 56, shown connected between the supply voltage and lines running from hall sensors 58, are pull up resistors for the waveform sensing function of the device.

In the configuration shown in FIG. 2, bridge rectifier 34 provides a steering function so that no matter what polarity of voltage is applied at pins 40 and 42 the proper polarity of voltage is output from pins 44 and 46. This can be seen upon consideration of the following example. Assume that the $V_{motor}$ is applied so that pin 40 is more positive than pin 42. This will cause diode 48 to be forward biased and to permit current to flow to pin 46. Similarly, diode 42A, shown having a cathode connected to pin 44 and an anode connected to pin 42, will be forward biased so that current will flow from pin 44 to 42 and to the more negative potential of $V_{motor}$.

Conversely, when the signal $V_{motor}$ is such that a negative potential is applied to pin 40 and a positive potential is applied to pin 42, diode 42B will be forward biased to conduct current from pin 42 to pin 46 and thence to line 18 and the plus V terminal of motor controller driver 12. Similarly, diode 40B will be forward biased to conduct current away from pin 44 to pin 40 of bridge rectifier 34. Thus, no matter what the polarity of $V_{motor}$, the proper polarity of supply voltage will be applied to motor controller driver 12.

Diode 36 and resistor 38 provide a direction control signal to forward/reverse line 20 which is a function of the polarity of the $V_{motor}$ signal. Diode 36 and resistor 38 are connected between pins of opposite polarity, when $V_{motor}$ has a polarity that places pin 40 at a more positive polarity than pin 42. When $V_{motor}$ is such that pin 40 is at a more positive potential then pin 42, diode 36 is forward biased and conducting so that the signal applied to line 20 is near the minus potential of pin 42. This instructs the motor controller/driver circuit 12 to provide drive signals that will cause the motor 10 to rotate in a clockwise direction. For the motor controller/driver circuit device specified above, a logic zero level specifies a clockwise rotational mode.

Conversely, when the polarity of $V_{motor}$ is such that terminal 40 is at a more negative potential then terminal 42, diode 36 is reversed biased and not conducting, and in turn, resistor 38 pulls-up line 20 to a positive potential. Recall that whatever the polarity of $V_{motor}$, terminal 46 will be at a positive polarity. This places a positive potential on the forward/reverse line 20, which will cause motor controller/driver device 12 to output drive signals to motor 10 to cause motor 10 to rotate in a counter-clockwise direction.

In the above manner, the present invention permits a multi-phase brushless DC motor to be driven in a direction which is a function of the polarity applied to drive the motor 10. In this manner the present invention permits a multi-phase brushless DC motor to closely mimic the operation of a brush type PM motor; in other words, when the user connects power to the invention, the motor runs. The rotation of the motor is in a direction which is a function of the polarity of the power applied to it. Thus, if the direction is incorrect the user can reverse the power supply leads to obtain the correct direction of rotation. The capacitor 58, shown as part of polarity adjust circuit 14 serves to provide filtering and surge protection for the motor controller/driver circuit 12.

It is to be understood that the circuit of FIG. 2 can be modified to provide other modes of operation which are also useful. For example, diode 36 could be taken out of the circuit. As such, bridge 34 would continue to provide the correct polarity of power to motor controller/driver 12, but the motor would be controlled to operate in the counterclockwise direction. Alternatively, instead of using diode 36 and resistor 38, forward/reverse line 20 could be connected directly to terminal 44. This would cause the motor to rotate in the clockwise direction regardless of the polarity of the voltage $V_{motor}$.

With the configuration of FIG. 2, an AC signal for $V_{motor}$ can be used. As such, diode 36 would be deleted from the circuit and forward/reverse line 20 and resistor 38 would be connected to the appropriate terminal (44 or 46) that would provide the proper forward/reverse control.

The terms and expressions which have been employed herein are used as terms of description and not of limitation, and there is no intention in the use of such terms and expressions of excluding equivalence of the features shown and described, or portions thereof, it being recognized that various modifications are possible within the scop of the invention claimed.

I claim:

1. An apparatus for controlling the direction of rotation of a brushless motor of the type which is controlled by a motor winding driver device which has a direction of rotation control pin wherein operating power is provided to power the motor, comprising bridge rectifier means having a pair of input terminals coupled to receive the motor operating power and a pair of output terminals for providing power to the motor winding driver device, wherein the polarity of the output terminals is independant of the polarity of the power at the input terminals; and means connected to the direction of rotation control pin of the motor winding driver device and coupled between one terminal of the input pair and one terminal of the output pair of terminals of the bridge recitfier means for indicating a polarity reversal of the input power, so that the direction of rotation of the brushless motor is controlled as a function of the polarity of the input power.

2. The apparatus of claim 1 wherein the one terminal of the output pair to which the indicating means is coupled is of a first polarity, and the one terminal of the input pair to which the indicating means is coupled is of a different polarity than the first polarity.

3. The apparatus of claim 2, wherein the indicating means comprises
   a resistor;
   a diode connected in series with the resistor so that the resistor has a free end and the diode has a free end, wherein the free end of the resistor is connected to one terminal of the output pair of terminals and the free end of the diode is connected to one terminal of the input pair of terminals, and further wherein the junction of the resistor and diode is coupled to the direction of rotation control pin.

4. The apparatus of claim 3, wherein the diode has an anode which is connected to the resistor and a cathode which is connected to the one terminal of the input pair of terminals.

* * * * *